July 8, 1969 D. M. SAUTER ET AL 3,454,782

MAGNETIC CORE GATING CIRCUIT

Filed March 5, 1963

INVENTOR.
DONALD M. SAUTER
HUGH ABERNETHY III

BY Arthur H. Swanson

ATTORNEY.

United States Patent Office 3,454,782

Patented July 8, 1969

3,454,782

MAGNETIC CORE GATING CIRCUIT

Donald M. Sauter, Saint Davids, and Hugh Abernethy 3rd, Rosemont, Pa., assignors to Honeywell Inc., a corporation of Delaware Filed Mar. 5, 1963, Ser. No. 262,912
Int. Cl. H03f 9/00; H03k 17/02
U.S. Cl. 307—88 10 Claims This invention relates to signal gating circuits. More specifically, the present invention relales to magnetic core signal gating circuits.

An object of the present invention is to provide an improved magnetic core signal gating circuit.

Another object of the present invention is to provide an improved magnetic core signal gating circuit for selectively controlling an energizing signal for a load means.

Still another object of the present invention is to provide an improved magnetic core signal gating circuit selectively controlled by an AC source routed by remote switch contacts.

A further object of the present invention is to provide an improved magnetic core signal gating circuit, as set forth herein, having a simple operation and construction.

In accomplishing these and other objects, there has been provided, in accordance with the present invention, a magnetic core signal gating circuit having a means for saturating the cores by an AC signal from a power source in response to remote operated switches. A gate signal is supplied when the AC power signal is above a predetermined minimum to oppose this saturation and to produce a driving signal for a silicon controlled rectifier. The rectifier is arranged in a full-wave rectifier circuit for rectifying the AC signal to supply a unidirectional signal to a load means. The rectifier is operated by the combination of the driving signal and the gate signal to provide a load signal when the AC signal is above the predetermined minimum.

A better understanding of the present invention may be had from the following detailed description when read in connection with the accompanying drawing, in which.

Figures 1, 2:
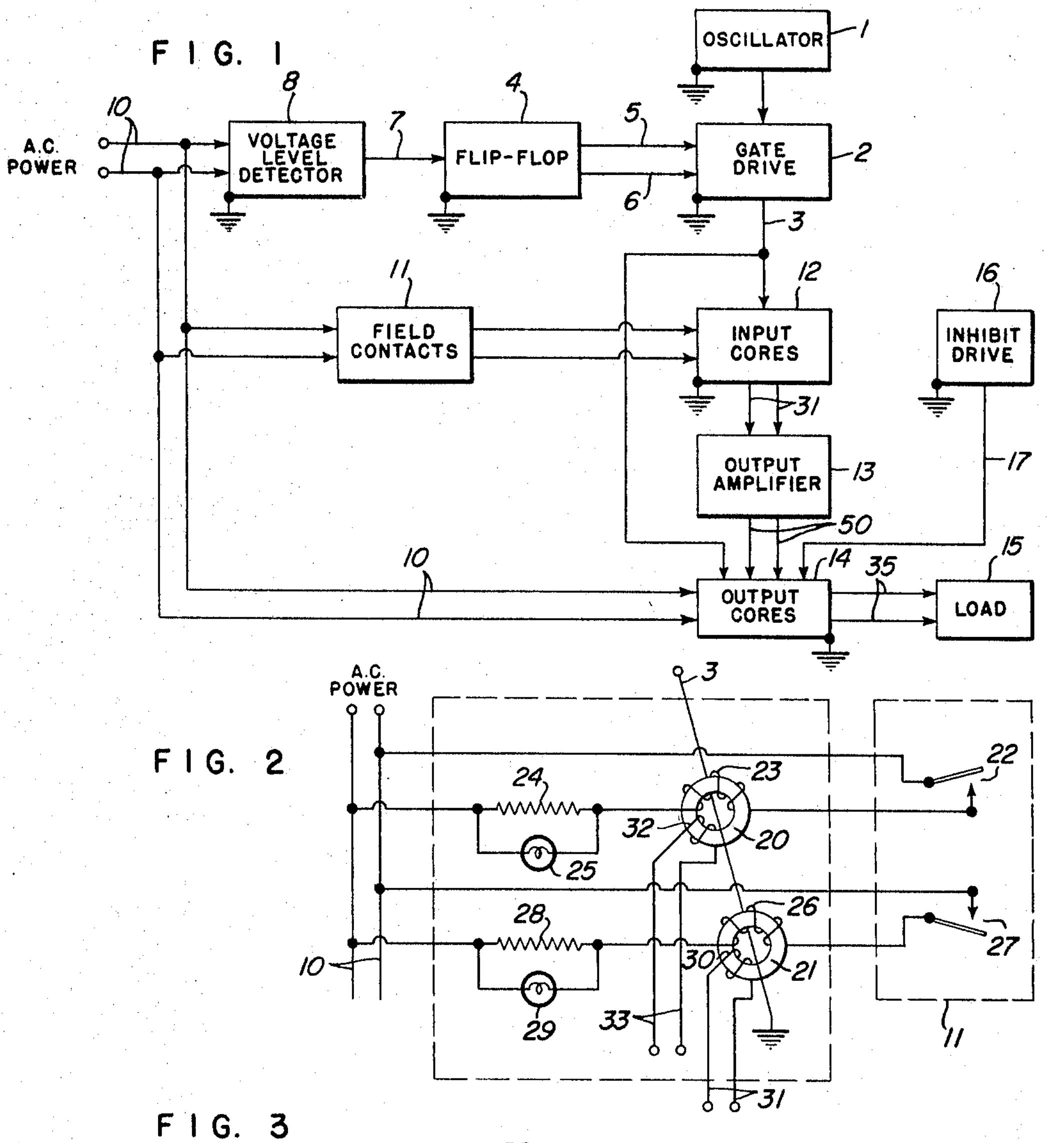
FIG. 1 is a schematic illustration of a signal gating apparatus embodying the present invention.
FIG. 2 is a schematic illustration of an input core signal gating circuit suitable for use in the apparatus shown in FIG. 1.

Referring to FIG. 1 in more detail, there is shown a signal gating apparatus having a driving oscillator 1. An output signal from the oscillator 1 is controlled by a gate drive circuit 2. The gate circuit 2 is effective to control the application of the oscillator output signal to a gate line 3. The gate circuit 2 is controlled between a conducting and non-conducting condition by a flip-flop circuit 4. Thus, one state of the flip-flop 4 applied along a line 5 is effective to place the gate 2 in a conducting condition, and the other state of the flip-flop 4 applied along a line 6 is effective to change the operation of the gate 2 to a non-conducting condition.

The flip-flop circuit 4 is switched between its aforesaid states by the application of a switch signal along a line 7 from a voltage level detector 8. The detector 8 is arranged to supply an output signal along line 7 during the time that a sensed voltage level is above a predetermined minimum signal level. When the sensed voltage level falls below this minimum, the signal on line 7 is terminated and the state of the flip-flop 4 is changed. The signal level sensed by the detector 8 is the amplitude of an AC signal connected to a pair of power lines 10. This AC signal is used to energize the apparatus shown in FIG. 1 when its ampltiude is above the aforesaid minimum level. Thus, the AC signal is applied through field contacts 11 to an input core device 12. The field contacts 11 are arranged to selectively control, from a remote location, the application of the AC signal to the input cores 12. A suitable device for use as the input cores 12 is shown in FIG. 2 and is described hereinafter.

An output signal from the input cores 12 representative of the effect of the field contacts 11 is amplified by output amplifier 13 and is applied to an output cores apparatus 14. The output cores 14 are arranged to control, in response to the output signal from the amplifiers 13, the application of the AC power applied along lines 10 to a load device 15. The selective control of the AC power by the output cores 14 is further shared by a signal from the gate 2 and a core inhibit signal from an inhibit drive device 16 applied along line 17.

In operation, the apparatus of the present invention is arranged to selectively supply a signal derived from the AC power source to the load 15 in response to the operation of the field contacts 11. The voltage level of the AC power is monitored by the detector 8 to terminate the supply of AC power to the load 15 when it has an insufficient amplitude for utilization by the load 15. Thus, the output signal from the detector 8 is used to switch the flip-flop 4 between its operative states to selectively energize one of the output lines 5 and 6. As previously discussed, one of the lines 5 and 6 is used to open the gate circuit 2 to provide a gate signal on line 3, while the other one of the lines 5 and 6 is used to apply a signal which is effective to close the gate 2 to terminate the signal on line 3. In other words, when the amplitude of the AC power is above a minimum amplitude, a gate signal is applied to line 3 by oscillator 1. The gate signal is terminated when the AC power signal is below a minimum amplitude.

The gate signal on line 3 is applied to the input cores 12 to provide a driving signal therefor. A selective operation of the field, or remote, contacts 11 is effective to apply an AC signal from the lines 10 to respective ones of the input cores 12 in accordance with the presence of the combination of the gate signal and the field contact signal. This output signal is amplified by the amplifiers 13 and is applied to a predetermined one of the output cores 14. It is to be noted that this output signal may be applied to the amplifiers 13 in a logic pattern by introducing further logic elements between the cores 12 and the amplifier 13. The output cores 14 are arranged to provide a selective conducting path between the AC power lines 10 and the load 15. This selective path is established by the effect of the signal from the amplifiers 13 in the presence of the gate signal on line 3 and an inhibit drive signal on line 17 from the inhibit drive 16. Thus, the gate signal on line 3 is effective to control the application of the AC power derived signal from lines 10 to the load 15 to provide a signal having an amplitude suitable for the load 15.

Referring now to FIG. 2, there is shown an input core device suitable for use as the input core 12 shown in FIG. 1. For purposes of illustration, the device 12 is shown with two cores 20 and 21; however, it is understood that the circuits shown in FIG. 2 may be duplicated to provide any desired number of core circuits. The AC power from the lines 10 is applied through a field, or remote, contact 22 to a winding 23 on the core 20. The AC signal is, then, returned to the line 10 through a resistor 24 having an indicator light 25 connected thereacross. Similarly, the core 21 has a winding 26 energized through a field contact 27 and resistor 28. Indicator light 29 is connected in parallel with resistor 28.

The drive line 3 from the gate 2 is passed through both cores 20 and 21 to provide a driving signal therefor. A sense winding 30 on the core 21 may be brought out to a pair of lines 31. Similarly, the core 20 is arranged with a sense winding 32 having output lines 33.

In operation, the circuit shown in FIG. 2 is effective to selectively energize the indicating lights 25 and 29. Assume, the field contact 27 is closed by a selective manual or automatic means at the contact apparatus 11. The AC power from lines 10 is connected through the contact 27 to the winding 26 and the light 29. The resulting current through the winding 26 is arranged to saturate the core 21. The core 20 is retained in an unsaturated condition by the open condition of switch 22. The application of a gate signal to the gate line 3 is arranged to supply a current which is effective to produce a magnetic field in the core 21 which is equal and opposite to that produced by the AC signal which is supplied upon the closure of contact 27. The resulting effect on the core 21 is to drive the core 21 out of its former saturated state. This action, in turn, is effective to produce an output signal on the sense winding 30 which signal is applied to output lines 31. The effect of the gate signal on the unsaturated core 20 is to produce a saturated condition of the core 20 in an opposite direction to that which would be produced by the effect of the field contacts 22. Since the change of the magnetic field for the core 21 is opposite to that of core 20, the polarity of the output signal on lines 31 is representative of the aforesaid magnetic field cancellation. This output signal is applied to output cores 14 to control the supply of an energizing signal to the load 15. As previously mentioned, this output signal may be further modified by introducing additional signal logic structure before the cores 14.

Figure 3:
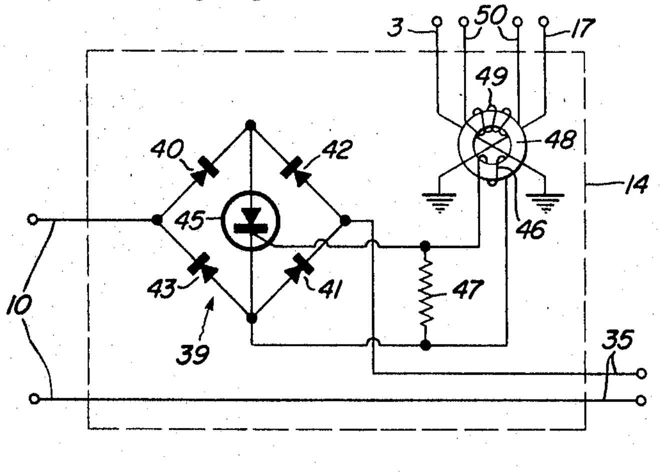
FIG. 3 is a schematic illustration of an output core signal gating circuit suitable for use in the apparatus shown in FIG. 1.

In FIG. 3, there is shown a suitable device for use as the output apparatus 14 shown in FIG. 1. As in FIG. 2, the device has been simplified for purposes of illustration, but it may comprise any desired number of duplicates of the illustrated circuit. The AC power from lines 10 is applied to a pair of output lines 35, arranged to be connected to the load 15, through a diode rectifier bridge 39 comprising diodes 40, 41, 42 and 43. Thus, the diode bridge 39 has one diagonal thereof connected in one of the lines 10. A silicon controlled rectifier 45 has its cathode-anode path connected across the other diagonal of the diode bridge 39. The firing electrode of the rectifier 45 is connected through a sense winding 46 to the cathode of the rectifier 45. A resistor 47 is, also, connected across the sense winding 46. The winding 46 is arranged on a core 48 having a drive winding 49 connected by a pair of lines 50 to the amplifiers 13. The inhibit line 17 is passed through the core 48 along with the gate line 3 to provide two additional magnetic fields for the core 48.

The field provided by the gate signal on line 3 is arranged to oppose the inhibit signal on line 17. Thus, the presence of both of these signals is effective to cancel their respective effects on the core 48. The inhibit signal from the inhibit drive 16 is arranged to saturate the core 48 when not opposed by the gate signal. The saturated condition of the core 48 is effective to prevent a transfer of an input signal on winding 49 to the output, or sense, winding 46. Thus, when the gate signal is applied to core 48, in coincidence with an inhibit signal, the core is unsaturated and an output signal is developed across the winding 46 from the effect of the input winding 49. The output signal from the winding 46 is arranged to supply a firing potential for the controlled rectifier 45. Since the gate signal is delayed, as previously discussed, until the AC signal on lines 10 is above a predetermined minimum, the rectifier 45 is not fired until the AC signal across the diode bridge 49 has reached an amplitude sufficient to maintain conduction through the rectifier 45. The rectified signal is applied along lines 35 to the load 15. When the AC signal falls below the aforesaid minimum level, the conduction through the rectifier 45 will be terminated, and the gate signal on line 3 is removed from the rectifier 45 until the amplitude of the AC signal again rises above the predetermined minimum level as detected by the detector 8. Thus, the unidirectional signal supplied to the load 15 is maintained above a minimum level to provide a useful signal therefor.

Thus, it may be seen that there has been provided, in accordance with the present invention, an improved magnetic core gating circuit for selective response to an AC power source controlled by remote switches and including a selectively controlled rectifier circuit for maintaining a load driving signal above a predetermined minimum magnitude.

What is claimed is:

1. A magnetic core signal gate circuit comprising a magnetic core having an input winding, a gate winding and an output winding, switch means operative to selectively apply an AC signal to said input winding, detector means operative to produce a gate signal when said AC signal has an amplitude above a predetermined minimum magnitude, and circuit means operative to apply said gate signal to said gate winding to oppose the effect of said AC signal upon said core.

2. A magnetic core signal gating circuit comprising a detector operative to produce a gate signal when a detected AC power signal is above a predetermined amplitude, circuit means arranged to connect an input of said detector to an AC power signal source, a first magnetic core having a first winding arranged for selective connection to said AC power signal source to selectively saturate said core, a gate winding connected to said gate signal from said detector to oppose the saturation of said core by said first winding, and a second winding arranged to produce an output signal dependent upon the combined effect of said first winding and said gate winding, a second magnetic core having an input winding connected to said output signal from said second winding, a source of inhibit signals, an inhibit winding on said second core connected to said ihibit winding, a second core gate winding on said core connected to said gate signal, said second core gate winding arranged to produce an effect to oppose said inhibit winding, a controlled rectifier arranged to rectify a signal from said AC signal source to produce a unidirectional load signal, and an output winding on said second core connected to control said rectifier circuit.

3. A device for converting a sinusoidal signal to a digitized signal comprising, sinusoidal signal supplying means, voltage level detecting means connected to said sinusoidal supply means, switch means connected to said detecting means, signal supplying means connected to said switch means, magnetic switching means, said switch means selectively permitting the connection of said signal supplying means and said magnetic switching means in accordance with the voltage level of said sinusoidal signal supplying means, means for selectively connecting said sinusoidal signal directly to said magnetic switching means, said magnetic switching means providing an output signal only in response to the coincident application of signals via said selective connection means and said switch means, further magnetic switching means, inhibit signal supplying means, said further magnetic switching means adapted to receive signals from said sinusoidal supplying means, said switching means, said magnetic switching means, and said inhibit drive signal supplying means, and output means, said output means receiving a signal from said further magnetic switching means only upon the coincident application of all of said input signals being applied thereto.

4. The device recited in claim 3 wherein said switching means comprises a flip-flop and gating means, said flip-flop being triggered by a signal from said detection means which indicates that the sinusoidal input signal provided by said sinusoidal supplying means exceeds a predetermined voltage level, said flip-flop providing a signal which enables said gating means only when said input sinusoidal signal exceeds said predetermined level.

5. A magnetic switching network comprising, a magnetic element, means for supplying a first signal to said magnetic element, means for supplying a second signal to said magnetic element, means for supplying a third signal to said magnetic element, said second and third signals being equal and opposite and effecting cancellation of one or the other when concurrently applied, means connected to said magnetic element to provide an output signal when all three of said input signals are supplied concurrently, a bridge gating network, a switching element connected to said bridge gating network to selectively enable conduction through said bridge network, said switching element connected to said means for providing an output from said magnetic element, and output means connected to said bridge gating network to receive a signal therefrom only when an output signal from said magnetic element causes the selective operation of said switching element.

6. A device for converting a sinusoidal signal to a digitized signal comprising, voltage level detecting means for detecting the level of an input signal, switch means connected to said detecting means, signal supplying means connected to said switching means, magnetic core means, said switching means selectively permitting the connection of said signal supplying means and said magnetic core means in accordance with the voltage level of the signal supplied to said detecting means, means for selectively connecting said input signal directly to said magnetic core means, said magnetic core means providing an output signal only in response to the coincident application of signals via said selective connection means and said switching means, further magnetic core means, inhibit signal supplying means, said further magnetic core means adapted to receive said input signal and signals from said switching means, said magnetic core means, and said inhibit drive signal supplying means, and output means for receiving a signal from said further magnetic core means only upon the coincident application of all of said input signals to said further magnetic core means.

7. The device recited in claim 6 wherein said switching means comprises a flip-flop and a gating means, said flip-flop being triggered by a signal from said detection means which indicates that the sinusoidal input signal provided by said sinusoidal supplying means exceeds a predetermined voltage level, said flip-flop providing a signal which enables said gating means only when said input sinusoidal signal exceeds said predetermined level, and said signal supplying means comprises a high frequency oscillator.

8. A magnetic switching network comprising, a magnetic element, first means for supplying a first signal to said magnetic element, means for supplying a second signal to said magnetic element, means for supplying a third signal to said magnetic element, said second and third signals being equal and opposite and effecting cancellation of one or the other when coincidentally applied, means connected to said magnetic element to provide an output signal when all three of said input signals are supplied concurrently, a diode bridge gating network, controlled rectifier means connected to said bridge gating network to selectively enable said bridge network, said controlled rectifier connected to said means for providing an output from said magnetic element such that said controlled rectifier is switched thereby, input means connected to said bridge network, and output means connected to said bridge gating network to receive a signal from said input means via said bridge network only when an output signal from said magnetic element causes the selective operation of said controlled rectifier means.

9. A device for converting a sinusoidal signal to a digitized signal comprising, sinusoidal signal supplying means, voltage level detecting means connected to said sinusoidal supplying means, flip-flop means connected to said detecting means, gate means connected to said flip-flop means, oscillator means connected to said gate means, magnetic core means, said gate means selectively permitting a connection between said oscillator means and said magnetic core means when the voltage level of the signal provided by said sinusoidal supplying means attains a predetermined level to switch said flip-flop means to enable said gate means, means for selectively connecting said sinusoidal signal directly to said magnetic core means, said magnetic core means providing an output signal only in response to the coincident application of signals via said contact means and said gate means, further magnetic core means, inhibit signal supplying means connected to said further magnetic core means, said further magnetic core means adapted to receive signals from said sinusoidal supplying means, said gate means, said magnetic core means, and said inhibit drive signal supplying means, and output means for receiving a signal from said further magnetic core means only upon the coincident application of all of said input signals to said further magnetic core means.

10. The device recited in claim 9, wherein said output means includes, bridge network means, and controlled switching means, said bridge network connected to said sinusoidal signal supplying means, said controlled switching means connected to said further core means to receive a signal therefrom and thereby enable conduction by said bridge network means.

References Cited

UNITED STATES PATENTS 3,040,301 6/1962 Howatt et al. -------- 340—174

BERNARD KONICK, *Primary Examiner.*

S. POKOTILOW, *Assistant Examiner.*

U.S. Cl. X.R.

307—314